Patented Aug. 11, 1925.

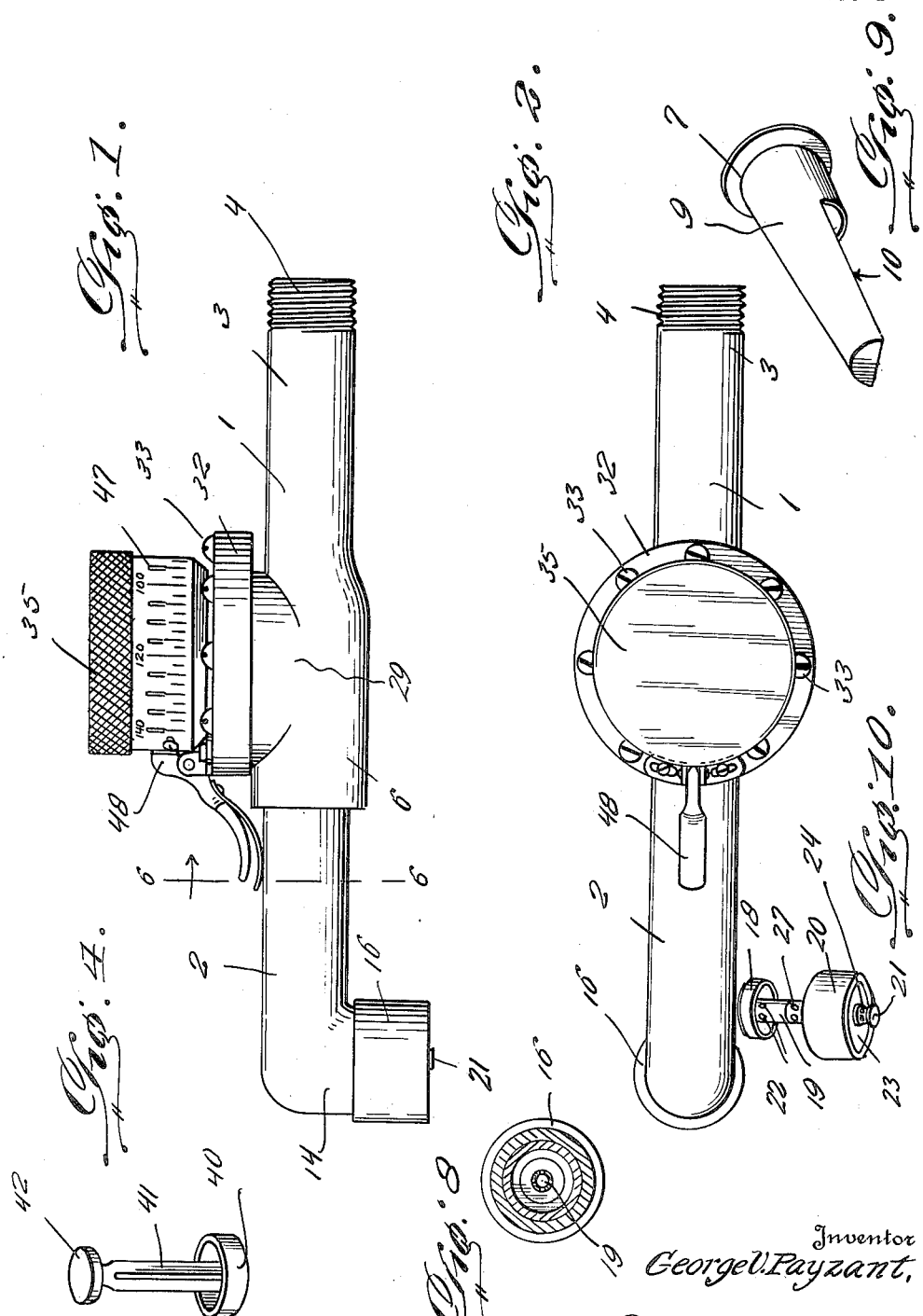

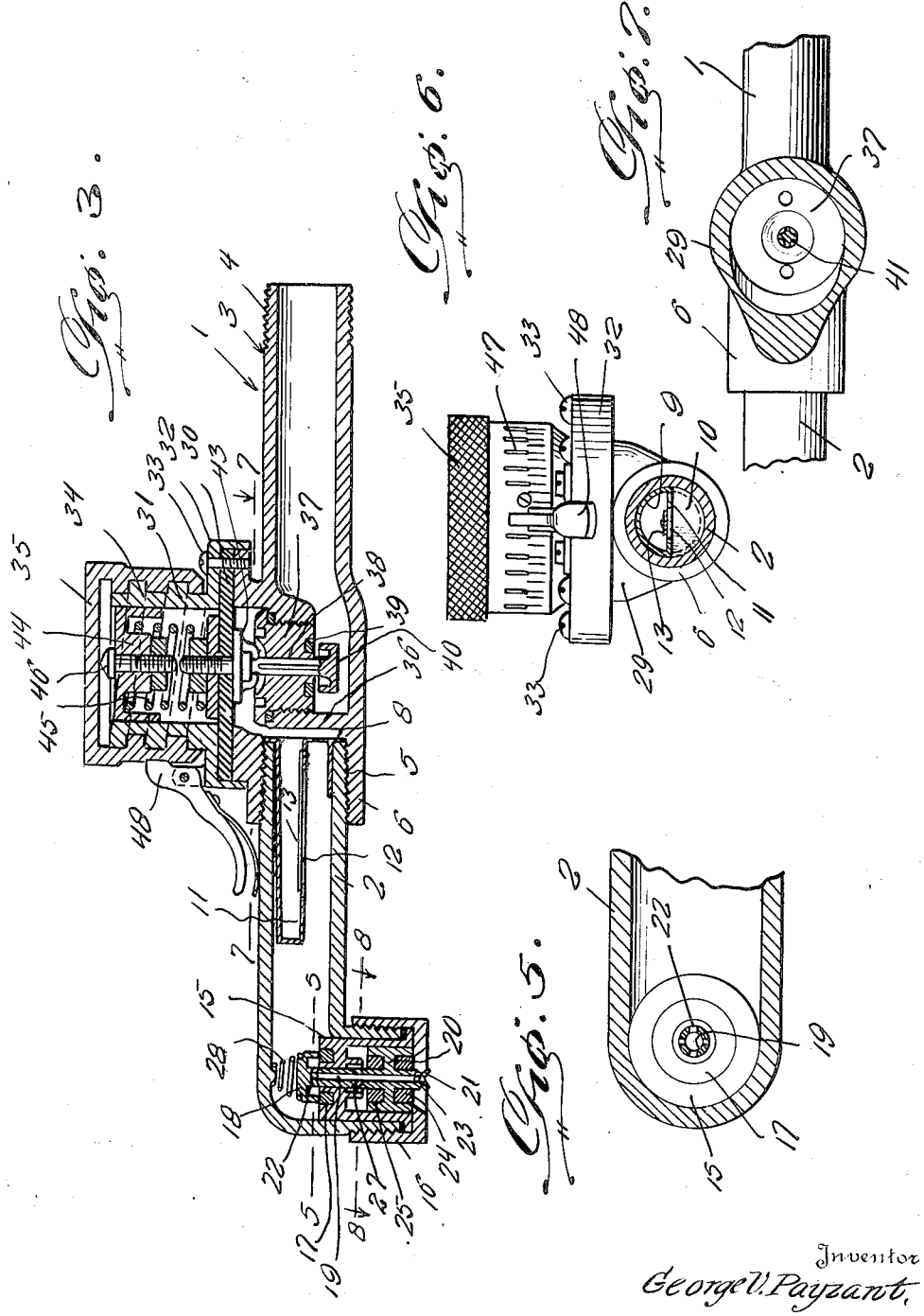

1,548,901

UNITED STATES PATENT OFFICE.

GEORGE V. PAYZANT, OF APPLETON, WISCONSIN.

CUT-OFF VALVE FOR AIR HOSE.

Application filed March 12, 1925. Serial No. 14,960.

*To all whom it may concern:*

Be it known that I, GEORGE V. PAYZANT, a citizen of the United States, residing at Appleton, in the county of Outagamie and State of Wisconsin, have invented certain new and useful Improvements in Cut-Off Valves for Air Hose, of which the following is a specification.

This invention relates to improvements in cut off valve heads for air hose, and particularly those used in conjunction with air hose for inflating motor vehicle tires, containing a valve operable to permit a flow of air from the hose into the tire upon engagement with the tire valve stem, together with means for cutting off the flow of air, when a predetermined pressure in the tire is reached.

An object of the invention is to provide a pressure control valve having a diaphragm connected therewith and disposed at the opposite side of the seat for the valve and in the outlet end of the head, so that the diaphragm will operate to close the pressure control valve to stop the flow of air when a predetermined pressure within the tire is reached, which will be indicated by the cessation of the sound produced by the sound reproducing device, in the head.

A still further object of the invention is to provide a special construction of outlet valve adapted to be normally maintained in seated position by the air pressure in the hose, and which is adapted to be moved to open position to permit a flow of air outwardly from the head, into a tire to be inflated, through the engagement of the head with the tire valve stem, which operates to unseat the valve.

The invention further comprehends other objects and improvements in the details of construction of the head and particularly in the manner of constructing the outlet valve, the pressure control valve, and the sound reproducing device, which are pointed out in detail in the following description and claims, directed to a preferred form of construction, it being understood, however, that various changes may be made in the specific construction, as illustrated and described, without departing from the spirit and scope of the invention as set forth.

In the drawings, forming part of this application:

Figure 1 is a side elevation of the improved cut off valve head structure.

Figure 2 is a plan view of the structure as illustrated in Figure 1.

Figure 3 is a longitudinal vertical sectional view through the valve head.

Figure 4 is a detail perspective view of the pressure control valve.

Figure 5 is a sectional view, taken on the line 5—5 of Figure 3.

Figure 6 is a sectional view, taken on the line 6—6 of Figure 1.

Figure 7 is a horizontal sectional view, taken on line 7—7 of Figure 3.

Figure 8 is a horizontal sectional view, taken on line 8—8 of Figure 3.

Figure 9 is a detail perspective view, on an enlarged scale, of the washer and reed holder interposed between the sections of the head structure.

Figure 10 is a detail perspective view of the cut-off valve, its stem and operating piston.

The improved head construction comprises a pair of sections 1 and 2 respectively, the section 1 having the inlet end 3 thereof of tubular form, provided with external threads at 4, for receiving a threaded fitting carried by the end of the air hose, in order to couple the head and the air hose together. The section 2 is of substantially tubular section and is provided with external threads 5, threadedly engaging in the internally threaded portion 6 of the section 1, the two members being secured in air tight relation and assembled in position and for the purpose of insuring the air tight fitting of the two sections, a sealing member 7 is provided, which is interposed between the end of the section 2 and the shoulder 8 on the section 1 at the inner end of the threaded portion of the extension 6, which is of substantially soft metal, so that a tight seal will be provided. The sealing member 7 carries a substantially cylindrical projection 9 from the central portion thereof, which is of hollow form, one half of the end portion being cut away, as indicated at 10, and being closed by a wall 11, which is provided with an opening at 12, over which is mounted a reed 13. The interior of the portion 9 communicates with the interior of the fitting, while the projection 9 extends within the inside of the section 2, as illustrated particularly in Figure 3 of the drawings. The flow of air will be from the fitting 1 through the fitting 2, so that in the flow of the air, through these fittings, it will be necessary for the same to flow past the reed 13, which will cause a vibration of the reed to produce sound according to the tune of the reed, which will always indicate the flow of air through the head for the purposes which will be presently described.

The free end of the section 2 of the head is provided with an angular extension 14 into which is fitted a seat member 15, retained therein by the bushing 16, threaded on the end of said extension 14. This seat member 15 is provided with a recess receiving a suitable packing 17 to provide a seat for the cut off valve 18. The central portion of the seating member is provided with an opening, in which the stem 19 slidably engages, and on the outer end of which is mounted a piston 20, which serves as an operating member for the valve 18. The stem 19 may be formed in cooperating sections where desired, to permit convenient assembly of the parts. The free end of the stem 19 is provided with a V-shaped projection 21, which serves to engage the valve stem of a tire valve, upon the application of the head to the tire valve stem, for the purpose of operating said stem and opening the tire valve. The V-shaped section of this projection will maintain the end of the stem seated therein at all times during the application of the head to the tire valve stem. Outlet for the flow of air from the section 2 is provided through the hollow stem, thru the position of the opening 22 in the stem under the valve 18, and the openings 23 in the stem around the V-shaped projection 21. A packing ring 24 is mounted in the outer end of the piston 20, for engagement with the tire valve stem, to cushion the contact of the piston with the valve stem, and take the wear off of said piston. A packing ring 25 is positioned on the inner end of the piston for engagement with the cylindrical projection 26 about the valve stem 19, for cushioning the movement of the valve to open position, when the piston is operated by the valve stem of a tire valve, when the head is applied to said valve stem. A plurality of openings 27, in the central portion of the tubular stem 19 provides communication between the stem and the chamber back of the piston for permitting escape of air therefrom in the operation of the piston. A coil spring 28 positioned between the valve 18 and inside of the section 2, also serves to move the valve to closed position for cutting off the flow of air from the hose as the head is removed from the tire valve stem.

The section 1 of the head, adjacent the connection with the section 2 is provided with an enlarged portion 29, extending laterally from the section and terminating in a seat for receiving a flexible diaphragm 30, which is secured to the end of said enlarged portion by a cylindrical member 31, having an annular flange 32, positioned over the diaphragm and the periphery of the enlarged portion 29, and secured thereto by suitable set screws 33. The body of the member 31 is provided with an enlarged square threaded portion 34, which threadedly receives a pressure setting cap 35, for adjustment thereon annularly, for varying the pressure of cut off of the head for the flow of air from the air hose in a manner that will be presently described.

The section 1 is provided with a web 36 extending across the passage through the section which is provided with a threaded opening, threadedly receiving a valve seat member 37, having an annular recess therein, around the openings 38, for receiving a seating washer 39. A valve 40, which is hereafter referred to as a pressure control valve is provided with a cruciform stem 41, provided with a disc portion 42 as in Figure 4, on the end thereof, which is slidably and removably received in the channel of a member 43, mounted on and movable with the flexible diaphragm 30. A lock nut and washer serve to secure the member 43 to the diaphragm, as clearly illustrated in Figure 3 of the drawings. A slide member 44 is mounted for sliding movement within the member 34, and serves to house one end of the coil spring 45, positioned between said slide member and the diaphragm 30. The slide member carries an adjustable stud 46, adapted to be locked in adjusted position by a suitable lock nut, as illustrated in Figure 3 of the drawing, which stud is adapted to engage the cap 35, so that the relative position of the slide member 44 to the cap 35 may be varied, in order that the proper tension or compression of the spring 45 may be obtained, so that the air pressure operating on the diaphragm will cause the movement thereof to close and seat the valve 40 to prevent flow of air from the air hose, when the predetermined pressure, indicated on the cap 35 is reached. The cap 35 is adjustable manually, and has a scale 47 provided on the exterior surface thereof, for cooperation with a setting lever 48, pivotally mounted on the flange 32 of the member 34 for maintaining the cap in set position, the setting lever also forming an index in conjunction with the scale 47, so that the desired pressure for which the operation of the diaphragm is to be set is indexed and set under the lever 48. This places sufficient tension on the spring 45 to maintain the valve 40 in open position, until the predetermined pressure to which it is set for closing is built up in the outlet end of the head, within the section 2, which operates directly on the diaphragm so that the flow of air will be cut off, when the desired pressure of inflation of a tire being inflated is reached, which will prevent overinflation of the tire.

In this construction, it will be seen that the operation of the reed serves to indicate the flow of air into the tire, so that as soon as the desired pressure in the tire is reached, at which time the diaphragm operates to close the valve 40, to prevent further flow of air through the air hose, the reed 13 will stop vibrating, as a result of which it will be immediately known that the tire has been inflated to the desired pressure, which would not otherwise be known, without testing the tire, with a separate testing instrument. The reed or other sound reproducing device, which may be used in its place therefore serves a flow indicating device, to determine the length of time it is necessary to maintain the head applied to a tire valve stem, to procure the inflation of the tire to a predetermined pressure.

The outlet valve in the section 2 is of special construction, in order that the engagement of the head with the tire valve stem will operate the piston and unseat the valve 18 for permitting a flow of air thru the tubular valve stem and into the tire valve stem to inflate the tire, the tire valve being held open by the conical projection 21, so that a free flow of air into the tire is permitted. The withdrawal of the head from engagement with the tire valve stem permits the immediate operation of the valve 18 to seated position, through the action of the spring 28, the pressure in the section 2 maintaining the valve 18 in seated position, after the same has once engaged the seating ring 17. The cap 35 may be screwed down on member 34 so that valve 40 will be held open through engagement of stud 46 with member 43.

The pressure control valve 40 is mounted for movement transversely of the head 1 in the direction of air flow therethrough and on the air hose side of the valve seat member 37, so that it is always subjected to the air pressure from a source of suitable air supply through the air hose, while the diaphragm 30 is connected with and is adapted to operate the valve 40 and is positioned at the outlet side of the pressure control valve and in axial alignment with the control valve 40, the member 34 extending laterally from the section 1 and serving to mount the diaphragm in operative relation on said section, in addition to carrying the tension adjusting means for varying the pressure at which the diaphragm is operated to seat the valve 40.

It will thus be seen that a simple and efficient structure of valve head for air hose has been provided, which is highly efficient in operation, readily accessible with respect to the parts thereof and adapted for easy assemblage.

What is claimed is:

1. A device of the class described comprising a pair of interfitting sections, one of said sections being adapted for attachment to an air hose, the other section having an outlet valve therein, a packing member positioned between the sections in interfitting relation for preventing leakage of air between said sections, and sound producing means carried by said washer member operable to indicate a flow of air through said sections.

2. A device of the class described comprising a pair or interfitting sections, one of said sections being adapted for attachment to an air hose, one of said sections being formed with an enlarged portion extending laterally therefrom, a wall extending transversely of the section in the portion provided with said enlarged portion and having a passage therethrough and a valve seat around said passage, a valve operable for engagement with said seat and movable on an axis at right angles to the direction of flow of air through said sections, a diaphragm mounted on the end of said enlarged portion in axial alignment with said valve and connected to the stem of said valve, and means secured to said enlarged portion of said section for securing said diaphragm in place on said section, operable to prevent operation of the diaphragm for operating said valve before a predetermined pressure is reached.

3. A device of the class described comprising a pair of interfitting sections, one of said sections having an enlarged portion projecting laterally therefrom and having the passage therethrough provided with a transverse wall at the point of formation of said enlarged portion thereon, a seat member mounted in said transverse wall and provided with an air passage substantially at right angles to the flow of air through said sections, a pressure control valve having a cruciform stem slidable in said seat member and a valve positioned in the inlet side of said section for seating cooperation with said seat member, said stem extending beyond the opposite side of said seat member, a diaphragm mounted on the end portion of said enlarged portion of the section, a threaded member engaging said diaphragm and mounted on said enlarged portion for rigidly mounting said diaphragm on said section, said diaphragm having a removable connection with the end of said valve stem, and adjustable tension means in said threaded member operable on said diaphragm to prevent operation thereof to seat the pressure control valve until a predetermined pressure determined by said tension means is exerted on said diaphragm.

4. A device of the class described, comprising a pair of assembled sections, one of said sections being provided with an externally threaded end portion, a seat member mounted in the end portion of said section, a cap threadedly mounted on the end portion of the section for mounting the seat member therein, an outlet valve slidably mounted in the seat member having its valve head disposed inwardly thereof and adapted for seating cooperation therewith, said valve head having a tubular stem projecting therefrom, through said seat member and said cap, a piston mounted on said valve stem and slidable within said seat member engageable to operate said valve stem and seat to unseat the valve from engagement with the seat member, said valve stem being formed with openings to permit a flow of air from the sections thereto, said stem being formed with openings in the central portion to provide communication between the chamber back of the piston and the stem.

In testimony whereof I affix my signature.

GEORGE V. PAYZANT.